(12) United States Patent
Ploumen

(10) Patent No.: US 9,077,818 B2
(45) Date of Patent: Jul. 7, 2015

(54) REMOTELY MIGRATING FROM A FIRST SERVICE TO A SECOND SERVICE

(75) Inventor: Franciscus Maria Ploumen, Winsor, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 2191 days.

(21) Appl. No.: 11/316,001

(22) Filed: Dec. 22, 2005

(65) Prior Publication Data

US 2006/0233352 A1    Oct. 19, 2006

Related U.S. Application Data

(60) Provisional application No. 60/671,028, filed on Apr. 13, 2005.

(51) Int. Cl.
*H04M 1/00*     (2006.01)
*H04M 11/06*    (2006.01)
*H04L 29/06*    (2006.01)

(52) U.S. Cl.
CPC ....... *H04M 11/062* (2013.01); *H04L 29/06027* (2013.01); *H04M 11/066* (2013.01); *H04L 65/1043* (2013.01); *H04L 65/1026* (2013.01); *H04L 65/1036* (2013.01)

(58) Field of Classification Search
CPC ... H04M 19/001; H04M 3/305; H04M 1/745; H04M 19/02; H04M 3/08; H04M 3/22
USPC .................. 379/22.07, 413.01, 399.01, 93.14, 379/90.01; 349/22.07, 377, 399.01, 413.01
See application file for complete search history.

(56) References Cited

U.S. PATENT DOCUMENTS

| 5,216,704 | A   | * | 6/1993  | Williams et al. ........... 379/93.08 |
| 6,272,209 | B1  | * | 8/2001  | Bridger et al. ............. 379/27.01 |
| 6,343,114 | B1  | * | 1/2002  | Chea, Jr. .................... 379/29.01 |
| 6,668,060 | B1  | * | 12/2003 | Boudreaux, Jr. .............. 379/413 |
| 6,718,020 | B2  | * | 4/2004  | Caldera et al. ............. 379/93.14 |
| 7,676,031 | B2  | * | 3/2010  | Posthuma .................... 379/93.28 |
| 2002/0021787 | A1 | * | 2/2002 | Chea, Jr. .................... 379/29.01 |
| 2003/0169873 | A1 | * | 9/2003 | Enriquez et al. ......... 379/387.01 |
| 2004/0161100 | A1 | * | 8/2004 | Menasco, Jr. ................. 379/377 |
| 2006/0072606 | A1 | * | 4/2006 | Posthuma ..................... 370/463 |
| 2007/0116257 | A1 | * | 5/2007 | Duran et al. .................. 379/413 |

* cited by examiner

*Primary Examiner* — Akelaw Teshale
(74) *Attorney, Agent, or Firm* — RGIP LLC

(57) ABSTRACT

A system, method, and computer readable medium for remotely migrating from a first service to a second service, comprising sensing a ring wire state, sensing a tip wire state and switching a switch device to a direct current termination based upon a difference between the ring wire state and the tip wire state.

9 Claims, 4 Drawing Sheets

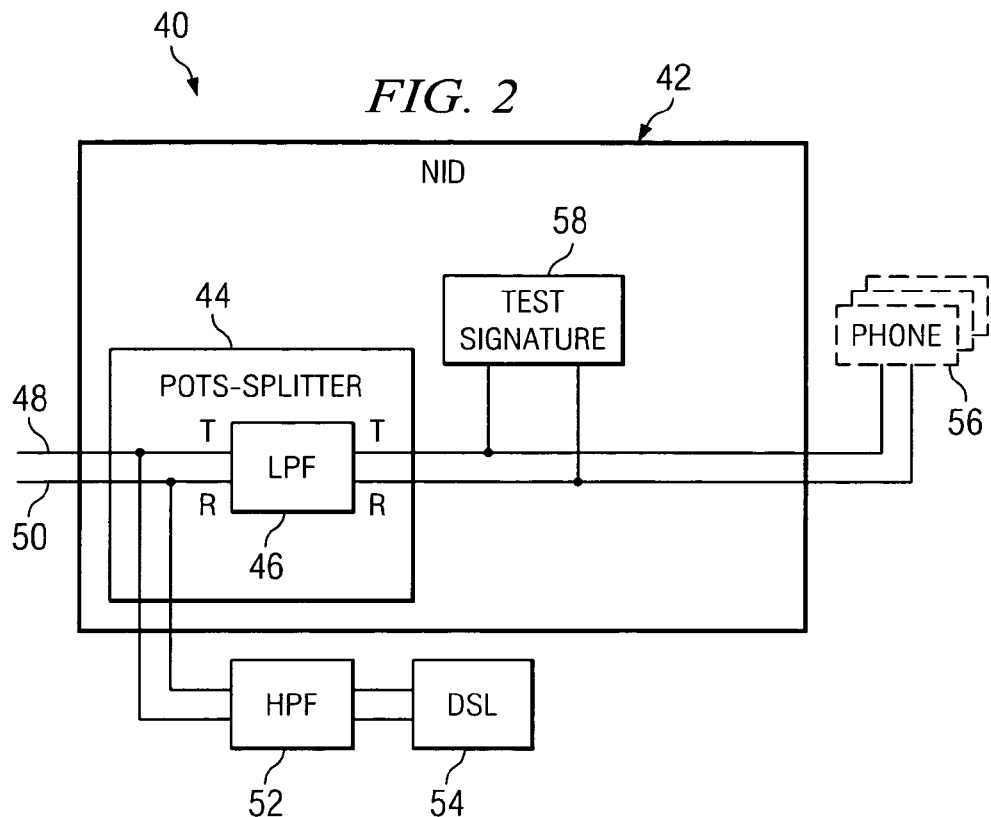
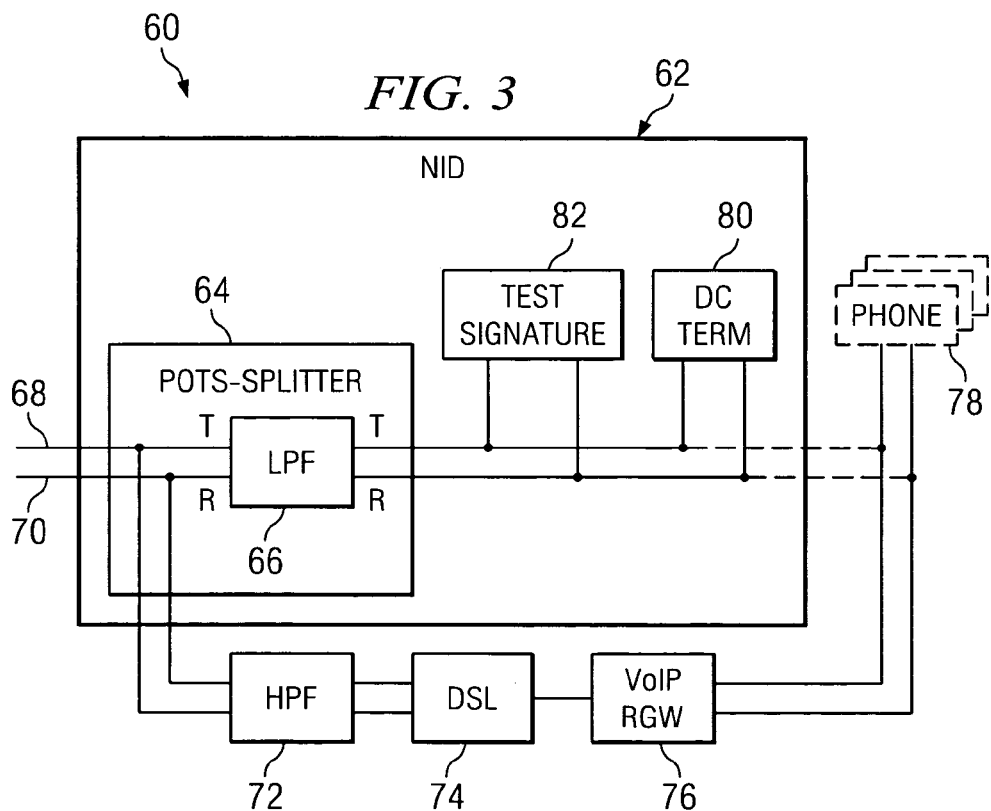

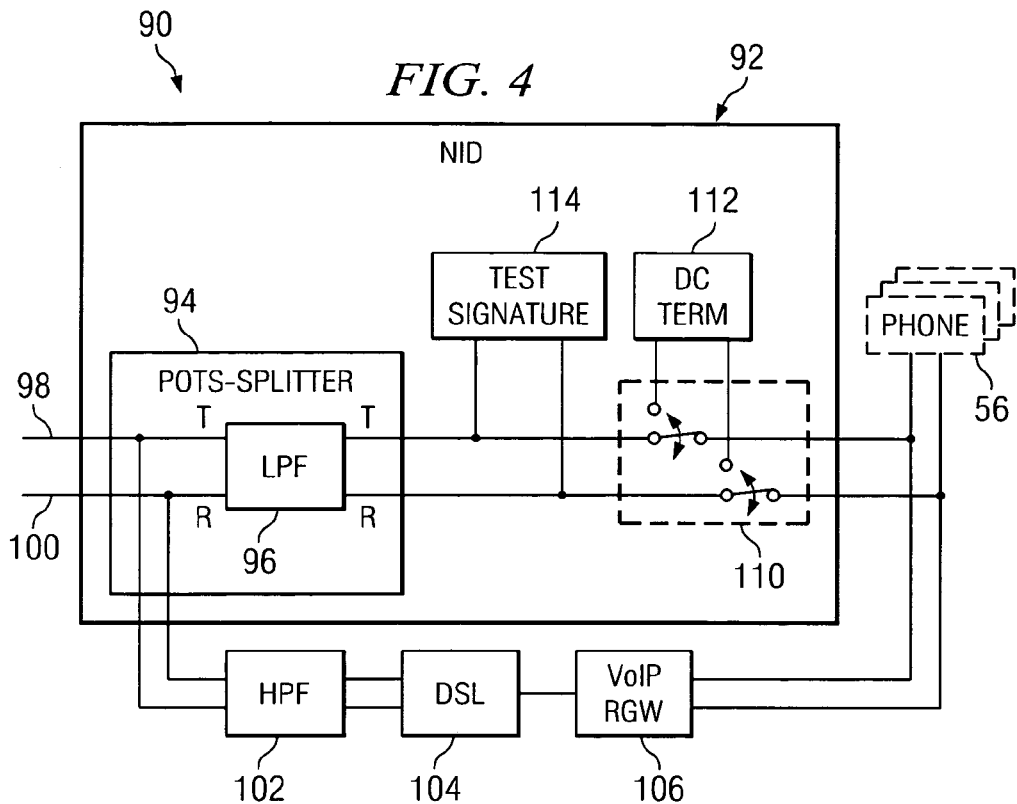
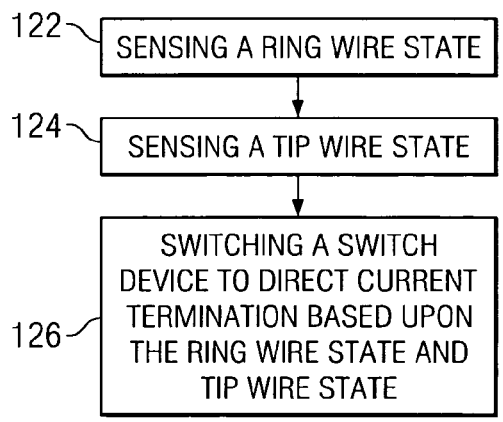
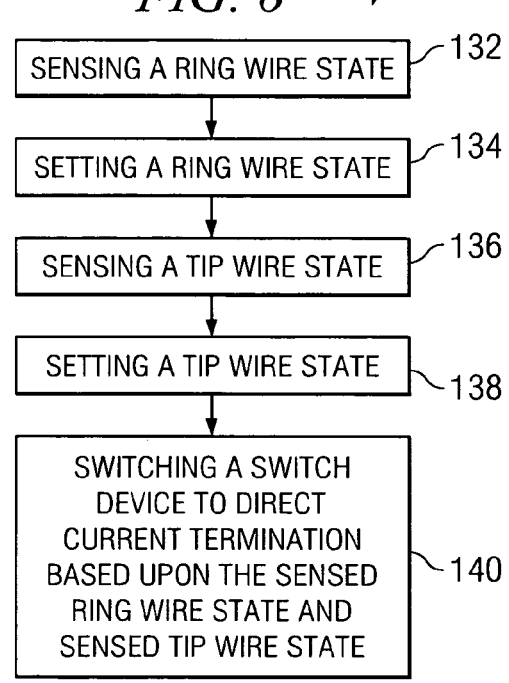

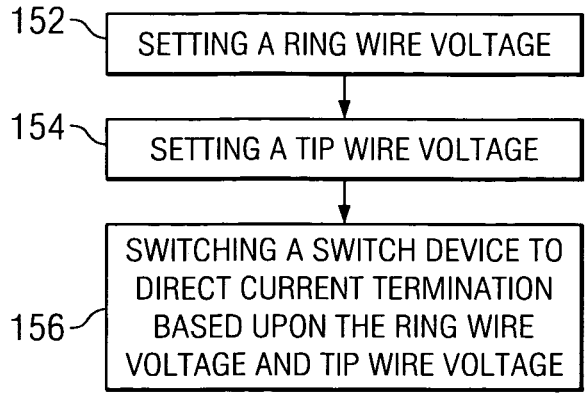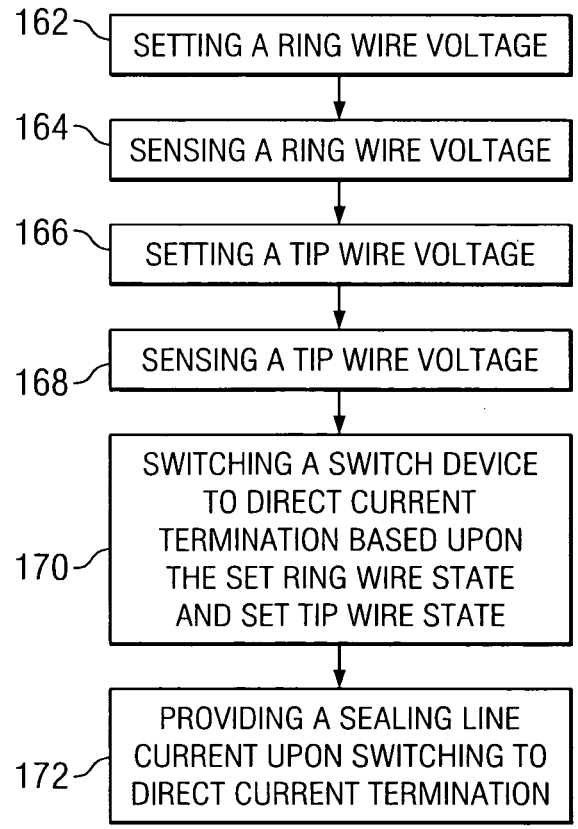

REMOTELY MIGRATING FROM A FIRST SERVICE TO A SECOND SERVICE

CROSS REFERENCE TO RELATED APPLICATIONS

The present patent application is related to and claims the benefit of provisional patent application No. 60/671,028, filed on Apr. 13, 2005, entitled TERMINATION CIRCUITRY TO MIRATE FROM POTS TO VOIP WITHOUT TRUCK ROLLOUT, the entire contents of which is enclosed by reference herein.

BACKGROUND OF THE INVENTION

The present invention is generally related to enabling utilization of a sealing current on a Digital Subscriber Lines (DSL) without Plain Old Telephony Service (POTS) and, more specifically, to a remote migration of a first service (POTS with DSL) to a second service (which is typically DSL with Voice Over Internet Protocol (VoIP)) which enables use of sealing current. The switching to DSL with VoIP is not required to switch from POTS to a remotely switched sealing current.

With the increase in use of cellular phones and Voice over Internet Protocol (VoIP), many residences and other users are discontinuing their use of POTS. DSL was initially created to be used in conjunction with POTS, where POTS utilized the frequency band below 4 Kilo Hertz (KHz) and DSL utilized the frequency band above 4 kHz. POTS injects a Direct Current (DC) as part of its basic operation. The direct current also acts as the sealing or wetting current which prevents galvanic corrosion of metallic (copper) lines and oxidation at splices. With the migration by residences to utilize DSL without underlying POTS, the benefit of the sealing or wetting current built into POTS is no longer present. Such a use of DSL without underlying POTS is referred to as dry DSL as there is no wetting current injected into the line.

Therefore, what is needed is remote migration of a service to allow sealing current to be utilized without underlying POTS. More specifically, what is needed is the remote migration from the first service to the second service to enable the use of the sealing current on DSL lines without underlying POTS that overcomes the limitations described above. The present invention remotely switches a switch device to a Direct Current Termination (DC Term) to allow use of the sealing current to provide the benefits of corrosion and oxidation resistance previously only enjoyed from utilizing POTS.

SUMMARY OF THE INVENTION

POTS utilizes a sealing current to prevent corrosion and oxidation of metallic lines and splices. POTS inherently provides wetting current by means of an off-hook loop current. Sealing current is alternatively termed wetting current. Sealing current is the minimum amount of electric current necessary to keep mechanical switch contacts from undergoing galvanic corrosion. Sealing current reduces oxidation at line splices and reduces galvanic corrosion which causes contacts to gain excessive resistance and prematurely fail. The sealing current is direct current injected into the line. POTS termination devices such as Subscriber Line Integrated Circuits (SLICs) measure a loop impedance in order to detect ON/OFF hook. Use of sealing current and measuring a Direct Current (DC) loop resistance is part of normal POTS operation.

Digital Subscriber Line Access Multiplexers (DSLAMs) were designed as an overlay for existing POTS networks, typically consist of the DSLAM itself and customer DSL transceivers and POTS splitters. The POTS splitter consists of a High Pass (HPF) and a Low Pass Filter (LPF). The POTS splitter is designed to separate narrow band voice and broad band DSL signals and avoid interference. The high pass filter is situated between a transmission line (twisted pair) and the DSLAM and customer DSL transceiver while the low pass filter is situated between the POTS and the telephone line. The transmission line twisted pair consists of a tip wire and a ring wire.

The current invention is for reconfiguring cabling and termination at the customer premises when migrating a customer with POTS and DSL to sealing current (SC) and DSL (optionally carrying a derived voice service such as, for example, VoIP). Migrating from a first service (POTS and DSL) to a second service (DSL with VoIP and sealing current) currently requires a manual disconnection of the in-house wiring that connects telephones to the loop interface remote terminal end (U-R) and connection to a Residential Gateway (RGW). A DC termination is required to implement the sealing current on a dry DSL line. In the present invention the DC termination by way of a switch device can also be integrated into the loop interface remote terminal end and activated remotely.

Adding DC termination in the loop interface remote terminal end currently requires a technician to manually perform the operation which is referred to as a truck roll out and which is expensive. Requesting the customer to add the DC termination to in-house wiring is not a reliable method of implementation as lack of installing the DC termination will not affect the provided service in the short term.

DSL was originally designed as the overlay to an existing POTS network. This requires low pass and high pass filters on both sides of the loop to separate the signals. As derived voice technology matures, DSL speeds increase and Class 5 switches age, derived voice in band the DSL data stream will become a more viable alternative to POTS introducing Dry DSL lines which will need to support sealing current. Supporting sealing current requires the DC termination at the customer premises. When migrating a customer with POTS and DSL to SC and DSL the telephone terminating the loop needs to be rewired to the residential gateway and the DC termination needs to be added.

The present invention provides the method to automatically switch the narrow band loop termination from the telephones in the in-house wiring to the DC termination in the loop interface remote terminal end. The switch device to automatically remotely accomplish this can be an electronic device such as a field effect transistor, solid state relay or electromechanical relay. The switch device can be controlled via either a DC voltage on a tip or ring wire or an AC control signal such as for example DTMF tones.

DSLAMs, designed as overlay for existing POTS networks, typically consists of DSL transceivers and POTS splitters. The POTS splitter consists of the high pass and low pass filter. The POTS splitter is designed to separate narrow band and broad band signals and avoid interference. The high pass filter is situated between the twisted pair and the DSL transceiver while the low pass filter is situated between the POTS and the telephone line. DSL can also operate in an environment where the underlying POTS is no longer present. This situation is referred to as dry DSL and voice services can be delivered in band the DSL data stream using a residential gateway.

The high pass filter is typically integrated with the DSL transceiver into the customer premise equipment and has typically a cut-off frequency around 25 kHz. The DSL modem terminates the DSL signal and provides data interface. The residential gateway, terminates POTS telephones and converts the time division multiplexed traffic into packets that can be send over the DSL modem. The low pass filter masks impedance in the DSL band and has typically a cut-off frequency around 4 kHz. The DC termination is connected for dry DSL scenarios in order to sink the sealing current. A test signature is optional and allows verification of the metallic connection. Telephones are connected directly onto the line in POTS service and to the residential gateway in derived voice service.

Ideally the direct current termination is only present on dry DSL loops such as in the SC with DSL configuration. To achieve the automatic switch from POTS phones terminating the line to DC termination terminating the line, the present invention adds the switch device in the loop interface remote terminal end that allows switching connectivity from the tip and ring wire terminating in a telephone to a direct current termination. The switch device can be a field effect transistor, solid state relay or electromechanical relay. The switch device is designed in such a way that it provides connectivity to the telephones if a Class 5 POTS local exchange is connected and connectivity to the DC termination if DSL with SC is activated. The switch device can be controlled via either a DC voltage on a tip wire or an AC control signal such as for example DTMF tones.

The present invention may achieve this is by driving the control of the switch from the voltage difference between the tip wire and the ring wire to ensure that the residential gateway SLICs use reversed polarity. By doing so, a lack of voltage on the tip wire will drive loop current via a negative DC voltage on ring wire and will connect the telephones to the line. The switch device can be controlled via by either a DC voltage on a tip wire or an AC control signal such as for example DTMF tones. Using the switch device in the loop interface remote terminal end to connect the phones to ring wire and tip wire improves reliability. Once the DSL with SC service is activated, the SLICs in the residential gateway will drive loop current with reverse polarity and disconnect the telephones from the line and connect the DC termination to the line. The present invention provides a solution to migrate POTS customers to DSL with SC while avoiding the need for manual reconfiguration of cabling and terminations in the loop interface remote terminal end.

In one embodiment of the present invention, a method for remotely migrating from a first service to a second service, comprises sensing a ring wire state, sensing a tip wire state and switching a switch device to a direct current termination based upon a difference between the ring wire state and the tip wire state. The first service may be plain old telephony service and digital subscriber line service, and the second service may be sealing current and digital subscriber line service or digital subscriber line service and voice over internet protocol with sealing current. The method may also comprise setting the sensed ring wire state and setting the sensed tip wire state. The ring wire state may be sensed on a ring wire and the tip wire state may be sensed on a ring wire. The ring wire state may be a ring wire voltage and the tip wire state may be a tip wire voltage. The method may also comprise determining a voltage difference between the ring wire voltage and the tip wire voltage and negatively biasing the ring wire voltage with respect to the tip wire voltage. The ring wire state may be a ring wire current and the tip wire state may be a tip wire current, and a current difference may be determined between the ring wire current and the tip wire current and a direct current termination may be connected based upon the difference between the ring wire current and the tip wire current.

In a further embodiment of the present invention, a computer readable medium comprises instructions for, setting a ring wire voltage, setting a tip wire voltage and switching a switch device to a direct current termination based upon a difference between the ring wire voltage and the tip wire voltage. The instructions may comprise sensing the set ring wire voltage and sensing the set tip wire voltage. The instructions may comprise determining a voltage difference between the sensed ring wire voltage and the sensed tip wire voltage, for negatively biasing the ring wire voltage with respect to the tip wire voltage and for providing a sealing line current upon switching of the direct current termination.

In yet a further embodiment, a system for remotely migrating from a first service to a second service, comprises a switch device adapted to selectively couple a direct current termination when an electronic device is coupled to a residential gateway. The first service may be plain old telephony service and digital subscriber line service and the second service may be sealing current and digital subscriber line service. A ring wire may be connected to the switch device which has a ring wire voltage, a tip wire may be connected to the switch device which has a tip wire voltage. The switch device may be switchable based upon a difference between the ring wire voltage and the tip wire voltage. The system may comprise a sealing current source electrically connected to the tip wire, the sealing current source electrically connected to the ring wire. The system may comprise a ring wire potentiometer connected to a ring wire to determine a ring wire voltage, the ring wire connected to the switch device and a tip wire potentiometer connected to a tip wire to determine a tip wire voltage, the tip wire connected to the switch device.

BRIEF DESCRIPTION OF THE DRAWINGS

FIG. 2 depicts a first service system in accordance with a preferred embodiment of the present invention;

FIG. 3 depicts a second service system in accordance with a preferred embodiment of the present invention;

FIG. 4 depicts a detailed system of remotely migrating from a first service to a second service in accordance with a preferred embodiment of the present invention;

FIG. 5 depicts a first method of remotely migrating from a first service to a second service in accordance with a preferred embodiment of the present invention;

FIG. 6 depicts a second method of remotely migrating from a first service to a second service in accordance with a preferred embodiment of the present invention;

FIG. 7 depicts a first software flow block of remotely migrating from a first service to a second service in accordance with a preferred embodiment of the present invention; and FIG. 8 depicts a second software flow block of remotely migrating from a first service to a second service in accordance with a preferred embodiment of the present invention.

DETAILED DESCRIPTION OF THE INVENTION

Figure 1:
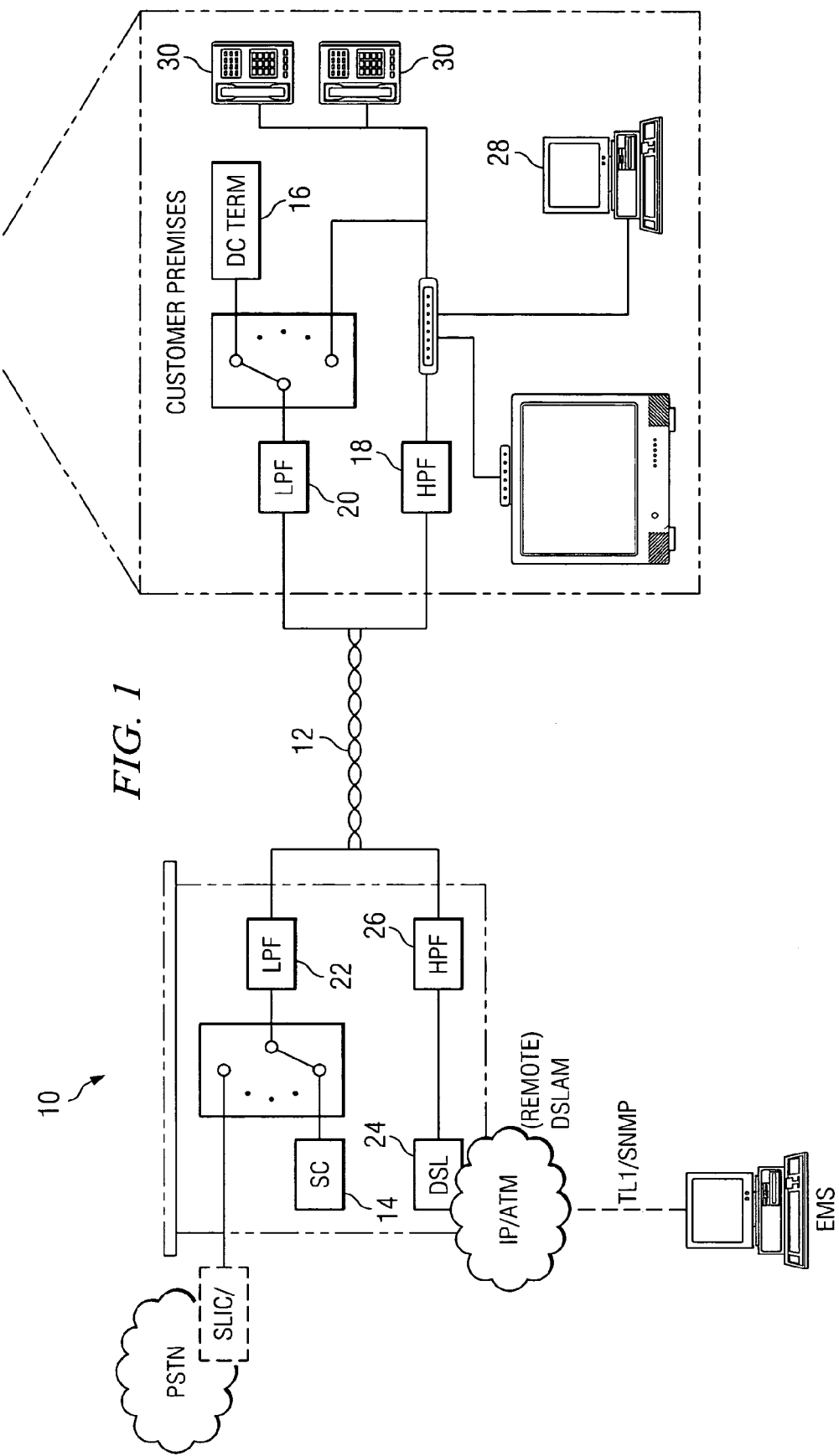
FIG. 1 depicts a system of remotely migrating from a first service to a second service in accordance with a preferred embodiment of the present invention.

Referring now to FIG. 1, a system 10 of remotely migrating from a first service to a second service is depicted. The system shown is a dry DSL system in which the communication from the DSLAM to the customer's premises does not have an underlying POTS system. POTS utilizes a sealing or wetting current which is a direct current injected into a transmission line 12 twisted pair to prevent galvanic corrosion of metallic (copper) lines and to prevent oxidation at splices. This sealing line current is injected into a transmission line from the SLIC in the Class 5 or DLC 14. With migration by residences to utilize DSL without the underlying POTS, the benefits of the sealing or wetting current built into POTS is no longer present. The present invention is a remote switch which terminates at a DC termination 16 a twisted pair and allows injects a wetting (sealing) current into Dry DSL lines to allow measurement of Direct Current (DC) loop resistances and to provide the benefits of corrosion and oxidation resistance previously only enjoyed from utilizing POTS.

DSLAMs were designed as overlays for existing POTS networks, typically consisting of customer DSL transceivers and customer POTS splitters. The customer POTS splitter consists of a customer High Pass Filter (HPF) 18 and a customer Low Pass Filters (LPF) 20. The customer POTS splitter is designed to separate narrow band voice and broad band DSL signals and avoid interference. The customer high pass filter is situated between the transmission line twisted pair and the customer DSL transceiver while a DSLAM low pass filter 22 is situated between the transmission line twisted pair and the sealing line current source. The transmission line communicably couples the DSLAM to the customer's premises. The transmission line is coupled to a DSLAM DSL transceiver 24 and to a DSLAM high pass filter 26 which can communicate broad band signals to an IP configured device 28 including a derived voice 30 enabled device, and is further coupled to the DSLAM low pass filter which terminates at the DC termination at the customer premises. These blocks or modules are software, hardware, firmware, and/or a combination of software, hardware, and/or firmware.

Referring now to FIG. 2, a more detailed system first system 40 loop interface remote terminal end 42 is depicted and comprises a number of blocks or modules that are software, hardware, firmware, and/or the combination of software, hardware, and/or firmware. A first service is plain old telephony service and digital subscriber line service is shown. A loop interface remote terminal end 42 has a POTS splitter 44 which has a low pass filter 46 connected to a tip line 48 and a ring line 50 which makes up a twisted pair. The twisted pair is also connected to a high pass filter 52 which is in turn connected to a customer DSL transceiver 54. The low pass filter in the first service (POTS and DSL) is connected directly to a telephone 56. The loop interface remote terminal end can also have connected to it a test signature 58 for assisting in system troubleshooting.

Referring now to FIG. 3, a more detailed system second system 60 loop interface remote terminal end 62 is depicted and comprises a number of blocks or modules that are software, hardware, firmware, and/or the combination of software, hardware, and/or firmware. The second service is voice over internet protocol and digital subscriber line service. A loop interface remote terminal end 62 has a POTS splitter 64 which has a low pass filter 66 connected to a tip line 68 and a ring line 70 which makes up a twisted pair. The twisted pair is also connected to a high pass filter 72 which is in turn connected to a customer DSL transceiver 74 and to a residential gateway 76. The residential gateway is connected is connected directly to a telephone 78. The low pass filtered utilized from typical POTS with DSL as shown in FIG. 2, tip and ring lines are terminated at a DC termination 80. The loop interface remote terminal end can also have connected to it a test signature 82 for assisting in system troubleshooting. In both FIGS. 2 and 3 the connections for the first service and second service are hard wired and require manual interaction to complete the circuit. For example, the DSLAM may be accessed by the cellular phone or the computer with external wireless capability (such as the wireless card) or internal wireless capability (such as 802.11 or any of the other 802 variants), or by the Internet Protocol enabled phone. The communications occurs via at least one of a wireless protocol, a wired protocol and a combination of the wireless protocol and the wired protocol.

Referring now to FIG. 4, a more detailed system second system 90 loop interface remote terminal end 92 is depicted and comprises a number of blocks or modules that are software, hardware, firmware, and/or the combination of software, hardware, and/or firmware. A first service is plain old telephony service and digital subscriber line service is shown. A second service is sealing current and digital subscriber line service. A loop interface remote terminal end 92 has a POTS splitter 94 which has a low pass filter 96 connected to a tip line 98 and a ring line 100 which makes up a twisted pair. The twisted pair is connected to a high pass filter 102 which is in turn connected to a customer DSL transceiver 104 and to a residential gateway 106. The low pass filter in the first service (POTS and DSL) is connected to a telephone 108 if a switch device 110 is set for POTS service, the high pass filter in the second service (SC with VoIP and DSL) is connected to the telephone through the customer DSL transceiver and residential gateway if the switch device is set for SC with DSL service. When the switch device is set for SC with DSL service, the low pass filtered tip and ring lines are terminated at a DC termination 112. The loop interface remote terminal end can also have connected to it a test signature 114 for assisting in system troubleshooting. In this figure the reconfiguration from first service to second service occurs at the switch 110 to the DC termination 112. For example, the DSLAM may be accessed by the cellular phone or the computer with external wireless capability (such as the wireless card) or internal wireless capability (such as 802.11 or any of the other 802 variants), or by the Internet Protocol enabled phone. The communications occurs via at least one of a wireless protocol, a wired protocol and a combination of the wireless protocol and the wired protocol.

Referring now to FIG. 5, a method of remotely migrating 120 from a first service to a second service in accordance with a preferred embodiment of the present invention is depicted. The method comprises sensing 122 a ring wire state, sensing 124 a tip wire state and switching 126 a switch device to a direct current termination based upon a difference between the ring wire state and the tip wire state. The transfer of information between the DSLAM and the customer premises occurs via at least one of a wireless protocol, a wired protocol and the combination of the wireless protocol and the wired protocol. The steps performed in this figure are performed by software, hardware, firmware, and/or a combination of software, hardware, and/or firmware.

Referring now to FIG. 6, a method of remotely migrating 130 from a first service to a second service in accordance with a preferred embodiment of the present invention is depicted. The method comprises sensing 132 a ring wire state and may also comprise setting 134 the sensed ring wire state. The method comprises sensing 136 a tip wire state and switching 140 a switch device to a direct current termination based upon a difference between the ring wire state and the tip wire state. The method may also comprise setting 138 the sensed tip wire state. The transfer of information between the DSLAM and the customer premises occurs via at least one of a wireless protocol, a wired protocol and the combination of the wireless protocol and the wired protocol. The steps performed in this figure are performed by software, hardware, firmware, and/or the combination of software, hardware, and/or firmware. Typically, POTS is enabled and the residential gateway is in high impedance mode and will detect a foreign voltage presence on the line, the operator discontinues the POTS service, the residential gateway detects the removal of the foreign voltage, upon instruction from the operator the residential gateway will drive a control signal (e.g., reversed DC) onto the line and the switch device will detect this and flip the switch and thereby disconnect inhouse wiring from the twisted pair and terminate the twisted pair with a DC termination. The switch device can be controlled via either a DC voltage on a tip wire or an AC control signal such as for example DTMF tones.

Referring now to FIG. 7, a first computer readable medium comprising instructions for remotely migrating 150 from a first service to a second service is depicted. The functionality performed by this computer readable medium or software, may also be performed by firmware, hardware, and/or the combination of software, hardware, and/or firmware. The computer readable medium comprises instructions for setting 152 a ring wire voltage, setting 154 a tip wire voltage and switching 156 a switch device to a direct current termination based upon a difference between the ring wire voltage and the tip wire voltage. The transfer of information between the DSLAM and the customer premises occurs via at least one of a wireless protocol, a wired protocol and a combination of the wireless protocol and the wired protocol.

Referring now to FIG. 8, a second computer readable medium comprising instructions for migrating 160 from a first service to a second service is depicted. The functionality performed by this computer readable medium or software, may also be performed by firmware, hardware, and/or the combination of software, hardware, and/or firmware. The computer readable medium comprises instructions for setting 162 a ring wire voltage, sensing 164 the set ring wire voltage, setting 166 a tip wire voltage and switching 170 a switch device to a direct current termination based upon a difference between the ring wire voltage and the tip wire voltage. The instructions may comprise sensing 168 the set tip wire voltage and may comprise providing 172 a sealing line current upon switching of the direct current termination. The transfer of information between the DSLAM and the customer premises occurs via at least one of a wireless protocol, a wired protocol and a combination of the wireless protocol and the wired protocol.

Although an exemplary embodiment of the system of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the DSLAM's, loop interface remote terminal ends, access management system or internet protocol devices. Also, these capabilities may be performed in the current manner or in a distributed manner and on, or via, any device able to provide and/or receive broadband signals. Further, although depicted in a particular manner, various modules or blocks may be repositioned without departing from the scope of the current invention. For example, the functionality performed by the loop interface remote terminal end can be self-contained. Still further, although depicted in a particular manner, a greater or lesser number DSLAMs, DSL transceivers, residential gateways, DC terminations and internet protocol devices can be utilized with the present invention in order to accomplish the present invention, to provide additional known features to the present invention, and/or to make the present invention more efficient.

What is claimed is:

1. A method, comprising:
    sensing a ring wire state of a ring wire to have a voltage;
    sensing a tip wire state of a tip wire to have a lack of voltage;
    automatically switching a narrow band loop termination of a first service of a switch device to a direct current termination associated with a second service based upon a detected difference between the ring wire state and the tip wire state, wherein the detected difference is a voltage difference between the ring wire and the tip wire; and
    transmitting a control signal via a direct current voltage to the switch device to initiate the switching of the narrow band loop termination responsive to the detected voltage difference by negatively biasing a sensed ring wire voltage with respect to a sensed tip wire voltage;
    wherein, the first service is plain old telephony service and digital subscriber line service, and the second service is digital subscriber line service and a sealing current or digital subscriber line service and voice over internet protocol with sealing current.

2. The method of claim 1 wherein, the first service is plain old telephony service and digital subscriber line service, and the second service is digital subscriber line service and a sealing current or digital subscriber line service and voice over internet protocol with sealing current.

3. The method of claim 1 comprising: setting the sensed ring wire state; and setting the sensed tip wire state.

4. The method of claim 1 wherein; the ring wire state is a ring wire current; and the tip wire state is a tip wire current.

5. The method of claim 4 comprising determining a current difference between the ring wire current and the tip wire current.

6. The method of claim 4 comprising connecting a direct current termination based upon the difference between the ring wire current and the tip wire current.

7. A non-transitory computer readable storage medium comprising instructions that when executed causes a processor to perform:
    setting a ring wire voltage of a ring wire to have a voltage;
    setting a tip wire voltage of a tip wire to have a lack of voltage;
    automatically switching a narrow band loop termination of a first service of a switch device to a direct current termination associated with a second device based upon a detected difference between the ring wire voltage and the tip wire voltage; and
    transmitting a control signal via a direct current voltage to the switch device to initiate the switching of the narrow band loop termination responsive to the detected voltage difference by negatively biasing a sensed ring wire voltage with respect to a sensed tip wire voltage;
    wherein, the first service is plain old telephony service and digital subscriber line service, and the second service is digital subscriber line service and a sealing current or digital subscriber line service and voice over internet protocol with sealing current.

8. The non-transitory computer readable storage medium of claim 7 comprising instructions for sensing the set ring wire voltage; and sensing the set tip wire voltage.

9. The non-transitory computer readable storage medium of claim 7 comprising instructions for providing a sealing line current upon switching of the direct current termination.

* * * * *